Aug. 8, 1961     E. D. ROBERTS     2,995,163
EXPANDABLE SAW BLADE
Filed Nov. 12, 1959

INVENTOR
EMORY D. ROBERTS
BY
ATTORNEY

United States Patent Office 2,995,163
Patented Aug. 8, 1961

2,995,163
EXPANDABLE SAW BLADE
Emory D. Roberts, 19159 Calvert St., Reseda, Calif.
Filed Nov. 12, 1959, Ser. No. 852,537
5 Claims. (Cl. 144—239)

This invention relates to a circular saw blade and more particularly to such a saw blade, made in sections, which may be expanded to vary the width of a cut taken by the blade.

An important object of the invention is to provide a circular saw blade, divided into a plurality of equal segments, said segments being capable of axial displacement with respect to each other to vary the width of the cut or rabbet taken by the saw.

Another object of the invention is to provide a sectional circular saw blade, the sections of which are connected together as by the arms of a web member.

A further object of the invention is to provide such a saw blade with front and rear circular plates, the free inwardly extending legs of each blade section being riveted or otherwise attached alternately to the front and rear plates.

A further object of the invention is to provide the rear plate with a hub portion and the front plate with a threaded opening and a threaded collar engaging the threads of the plate and extending over the hub and engaging the inner surface of the rear plate to separate the plates and thereby axially expand the sections with respect to each other.

Figure 1:
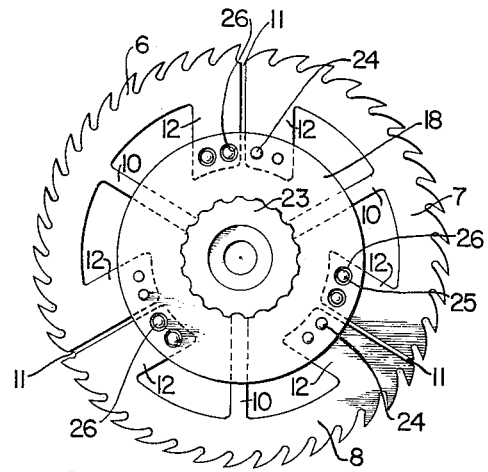
Figure 2:
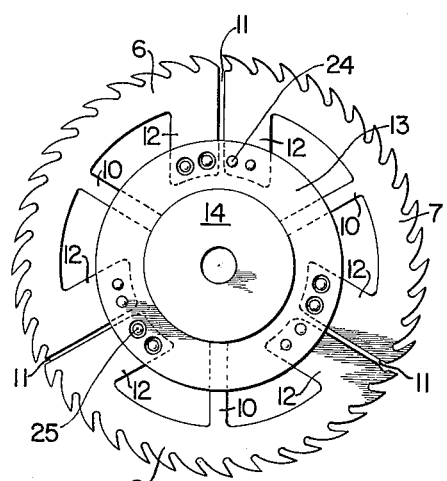
Figure 3:
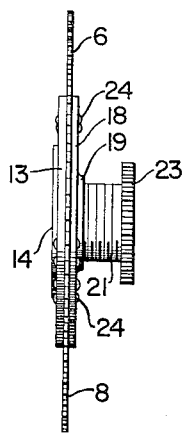
Figure 4:
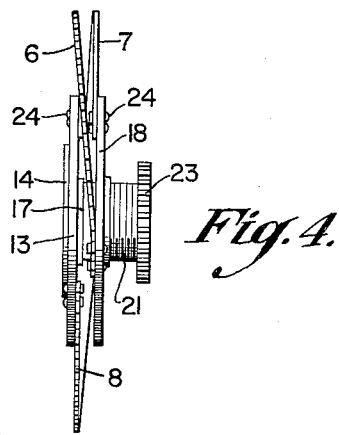
Figures 5, 6:
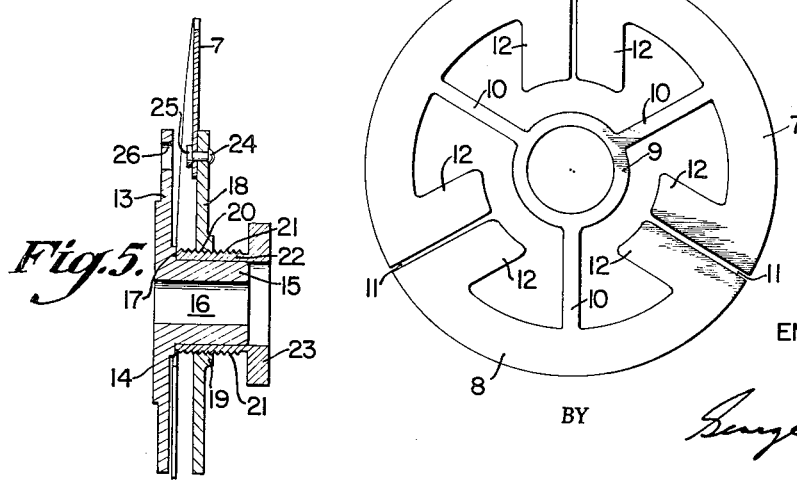

Other objects and advantages will become apparent when considered in connection with the accompanying specification and drawings, in which:

FIG. 1 is a front face view of the saw blade;
FIG. 2 is a rear face view of the saw blade;
FIG. 3 is a view in side elevation showing the blade unexpanded;
FIG. 4 is a view in side elevation showing the blade expanded;
FIG. 5 is a partial section of FIG. 4; and
FIG. 6 shows the blank from which the saw blade is made.

Referring specifically to the drawings in which like numerals are used to indicate similar parts throughout the various views, the saw blade comprises a plurality of identical sections or segments 6, 7, and 8. These segments are supported by a central web or spider 9 having radiating arms 10, the spider and arms being formed integral with the segments. Each of the saw blade segments is divided from each other along the portions 11 and each segment is provided with inwardly extending identical leg portions 12 which are capable of free movement with respect to each other.

The saw blade is provided with a rear circular plate 13, provided with a thickened center portion 14 to give strength to the plate. The plate 13 terminates in an inwardly extending hub 15 having an arbor receiving opening 16 extending therethrough. The hub 15 is provided with a thickened shoulder portion 17.

The face plate 18 is substantially identical in shape to the rear plate, the plate 18 having a thickened central portion 19, which portion is open and provided with threads 20, which threads receive the outwardly threaded portion 21 of a threaded collar 22. The threaded collar 22 has an internal diameter to frictionally fit over the outside of the hub 15. The threaded collar member 22 is further provided with a knurled or corrugated enlarged operating hand portion 23.

The segment portions 6, 7, and 8 of the saw blade have their inwardly extending leg-like portions 12 connected alternately as by rivets 24 to the respective front and rear plates of the saw. Thus, it will be seen that the saw segment 7 has one of its legs 12 riveted to the front plate 18, while the other leg is riveted to the rear plate. Likewise, segment 8 has one of its legs riveted to the front plate and the other leg riveted to the rear plate, and so on with respect to segment 6. It is imperative, however, that each blade segment have its adjacent leg portions riveted respectively to the opposite front and back face plates.

The rivets 24, which secure the leg portions of the respective saw blade segments to the front and rear plates, have enlarged bases 25. Consequently, in order to permit the segments to line up when they are completely unexpanded, the front and rear plates are provided with openings 26 sufficient to accommodate the rivet bases. Of course, the openings in the respective face and rear plates are positioned so that they are in alignment with the rivet bases of the respective rivets.

In the operation of the saw blade, it is first mounted on the usual saw arbor and preferably the segments lie flush between the front and rear plates, in which position the segments are in their unexpanded position. In this position, the saw can be used to cut off boards or the like, or to make a rabbet or the like in the face of the material being worked upon. When it is desired to increase the width of the rabbet being cut, it is only necessary to stop the saw and, holding the same fixed with one hand, the other hand can manipulate the hand piece 23 of the threaded collar 22 to turn the same in a direction to force the inner end of the collar against the surface 17 of the back plate. In so doing, the respective blade segments are expanded which, of course, increases the width of the kerf or rabbet cut taken by the saw when put into use. Therefore, the saw can readily be used in the capacity of a dado saw.

A preferred embodiment of the invention has been disclosed, but it is not intended that the invention be limited to the exact construction shown, but that the same be capable of variation and modifications within the scope of the following claims.

I claim:
1. An expandable rotary saw blade, comprising a central spider and a plurality of segments each having a leg connected to and extending inwardly from the segments to the spider, each segment having inwardly directed arms, front and rear plates to which the arms of the segments are alternately connected, the rear plate terminating in a hub portion, said front plate having a threaded opening therein, and a threaded collar threaded in said front plate and having its inner end engaging the inner surface of the back plate to separate said plates and thereby expand the saw segments.

2. A rotary cutter including a plurality of freely movable segmental sections having free ends and a central spider having radiating arms individually supporting each segment, a rear plate having a hub extending through the spider and a front plate having a threaded opening therein through which the hub passes, the respective free ends of the said segments being alternately attached to the front and rear plates, and a threaded collar surrounding the hub of the rear plate and threaded in the opening of the front plate, the inner end of said collar engaging the back plate to expand the segments when the collar is moved inwardly.

3. A rotary cutter as recited in claim 2, said front and rear plates having openings therein to receive the bases of the attaching members of the segmental sections.

4. A blank for producing a segmental rotary saw, said blank having a central spider and legs radiating therefrom and integral with the segments, said segments having inwardly directed enlarged arm-like portions, said portions being severed longitudinally thereof to provide a plurality of freely movable segments.

5. An expandable rotary saw blade, comprising a plurality of connected and freely movable spring steel saw segments, said segments having at their ends inwardly directed free leg portions, a rear plate terminating in a hub portion provided with an arbor opening and a front plate having a threaded opening through which the hub passes, and a threaded collar fitting the outer surface of the hub and threaded into the threaded opening of the front plate, the inner end of the collar abutting the inner surface of the rear plate, said collar terminating at its outer end in an operating hand piece, the free leg portions of the segments being alternately affixed to the front and rear plates, said plates having openings to receive the segment affixing terminals, whereby upon turning of the threaded collar the front and rear plates are moved with respect to each other to expand or contract the saw segments to increase or decrease the rabbet cut taken thereby.

References Cited in the file of this patent

UNITED STATES PATENTS

| | | |
|---|---|---|
| 294,067 | Osborn | Feb. 26, 1884 |
| 567,135 | Heald | Sept. 8, 1896 |
| 771,401 | Van Amberg | Oct. 4, 1904 |
| 966,701 | Palmer | Aug. 9, 1910 |
| 1,603,539 | Henson | Oct. 19, 1926 |
| 2,854,042 | Robinson | Sept. 30, 1958 |

FOREIGN PATENTS

| | | |
|---|---|---|
| 172,082 | Germany | June 18, 1906 |
| 812,721 | Germany | Sept. 3, 1951 |